US012197366B2

United States Patent
Lin et al.

(10) Patent No.: US 12,197,366 B2
(45) Date of Patent: Jan. 14, 2025

(54) USB INTEGRATED CIRCUIT, OPERATION METHOD OF USB INTEGRATED CIRCUIT AND USB DEVICE

(71) Applicant: VIA LABS, INC., New Taipei (TW)

(72) Inventors: Chun-Heng Lin, New Taipei (TW); Terrance Shiyang Shih, Milpitas, CA (US); Chin-Sung Hsu, New Taipei (TW)

(73) Assignee: VIA LABS, INC., New Taipei (TW)

( * ) Notice: Subject to any disclaimer, the term of this patent is extended or adjusted under 35 U.S.C. 154(b) by 186 days.

(21) Appl. No.: 17/990,739

(22) Filed: Nov. 21, 2022

(65) Prior Publication Data

US 2023/0169026 A1 Jun. 1, 2023

Related U.S. Application Data

(60) Provisional application No. 63/284,642, filed on Dec. 1, 2021.

(30) Foreign Application Priority Data

Aug. 22, 2022 (TW) .................................. 111131560

(51) Int. Cl.
*G06F 13/38* (2006.01)
*G06F 13/362* (2006.01)
*G06F 13/40* (2006.01)

(52) U.S. Cl.
CPC .......... *G06F 13/382* (2013.01); *G06F 13/362* (2013.01); *G06F 13/4027* (2013.01)

(58) Field of Classification Search
CPC .. G06F 13/382; G06F 13/362; G06F 13/4027; G06F 2213/0042; G06F 13/385; G06F 13/4295; G06F 13/102
See application file for complete search history.

(56) References Cited

U.S. PATENT DOCUMENTS 7,461,177 B2 * 12/2008 Drabczuk ............. G06F 9/4411
710/10
10,251,293 B2 * 4/2019 Tang .................... H05K 5/0278
(Continued)

FOREIGN PATENT DOCUMENTS

| CN | 107085507 | 8/2017 |
| TW | 201706772 | 2/2017 |
| TW | 201913402 | 4/2019 |

OTHER PUBLICATIONS

"Office Action of Taiwan Counterpart Application", issued on Feb. 3, 2023, p. 1-p. 9.

*Primary Examiner* — Farley Abad
(74) *Attorney, Agent, or Firm* — JCIPRNET (57) ABSTRACT

A USB IC, an operation method thereof, and a USB device are provided. The USB IC is disposed in the USB device and includes a sideband use interface circuit coupled to a sideband use pin of a USB connector of the USB device, and a control circuit. The control circuit is coupled to the sideband use interface circuit and reports a first adapter configuration to a USB host via the sideband use interface circuit so that the USB host enumerates the USB device. The control circuit observes a behavior of the USB host to the USB device after the USB device is enumerated. The control circuit determines whether the first adapter configuration is suitable for a connection manager of the USB host according to the behavior. If not, the control circuit reports a second adapter configuration to the USB host so that the USB host re-enumerates the USB device.

20 Claims, 5 Drawing Sheets

(56) References Cited

U.S. PATENT DOCUMENTS

| | | | |
|---|---|---|---|
| 2004/0203296 A1* | 10/2004 | Moreton | G06F 13/387 |
| | | | 439/894 |
| 2007/0143505 A1* | 6/2007 | Terrell, II | G06F 1/266 |
| | | | 710/10 |
| 2012/0042103 A1* | 2/2012 | Leaming | G06K 19/07 |
| | | | 710/62 |
| 2015/0201099 A1* | 7/2015 | Hamasaki | H04N 1/00318 |
| | | | 358/1.15 |
| 2018/0267918 A1 | 9/2018 | Raju | |
| 2018/0356873 A1 | 12/2018 | Regupathy et al. | |
| 2019/0317774 A1* | 10/2019 | Raghav | G06F 9/4411 |

* cited by examiner

USB INTEGRATED CIRCUIT, OPERATION METHOD OF USB INTEGRATED CIRCUIT AND USB DEVICE

CROSS-REFERENCE TO RELATED APPLICATION

This application claims the priority benefits of U.S. provisional application Ser. No. 63/284,642, filed on Dec. 1, 2021, and Taiwanese application serial no. 111131560, filed on Aug. 22, 2022. The entirety of each of the above-mentioned patent applications is hereby incorporated by reference herein and made a part of this specification.

BACKGROUND OF THE INVENTION

Field of the Invention

The invention relates to an electronic circuit, and more particularly, to a Universal Serial Bus (USB) integrated circuit, an operation method of the USB integrated circuit, and a USB device.

Description of Related Art

In general, the connection manager (CM) in Universal Serial Bus Generation 4 (USB4) is responsible for enumeration, configuration, and management work, and responsibilities thereof include: USB4 initialization, path setup and teardown, bandwidth management between configured tunnels, power state management, etc. Apparently, the connection manager is essential for the proper functioning of USB4 devices and hubs.

Unfortunately, the connection manager built into the USB4 host comes in various versions. Therefore, the working behavior of the connection manager may not be correct or consistent between different operating systems or firmware versions, which may lead to interoperability issues.

Specifically, the Intel USB4 host's connection manager is a firmware-based connection manager (implemented in firmware) and has been in development for a long time. In the early days, the Intel USB4 host's connection manager (NVM FW version V34) only supported Intel's USB4 devices, not the common USB4 devices from other vendors. However, the connection manager (NVM FW version V34) of this Intel USB4 host has been in the market for a long time, and not all computer vendors provide the new NVM FW version V41 firmware update tool.

Accordingly, how to design a USB device that is compatible with any version of the connection manager is one of the research topics for those skilled in the art.

It should be noted that the content of the "prior art" paragraphs is used to help understand the invention. Part of the content (or all of the content) disclosed in the "prior art" paragraphs may not be conventional techniques known to those having ordinary skill in the art. The content disclosed in the "prior art" paragraphs does not mean that the content has been known to those having ordinary skill in the art before the application of the invention.

SUMMARY OF THE INVENTION

The invention provides a USB integrated circuit, an operation method of a USB integrated circuit, and a USB device that may determine the version of the connection manager via the behavior of the USB host to the USB device so as to report the corresponding adapter configuration to the USB host, so that the USB device may be compatible with any version of the connection manager.

In an embodiment of the invention, a USB integrated circuit is suitable to be disposed in a USB device, and includes a sideband use interface circuit and a control circuit. The sideband use interface circuit is suitable to be coupled to a sideband use pin of a USB connector of the USB device. The control circuit is suitable to be coupled to the sideband use interface circuit and reports a first adapter configuration to a USB host via the sideband use interface circuit so that the USB host enumerates the USB device. The control circuit observes a behavior of the USB host to the USB device after the USB device is enumerated, and the control circuit determines whether the first adapter configuration is suitable for a connection manager of the USB host according to the behavior. When the first adapter configuration is not suitable for the connection manager, the control circuit reports a second adapter configuration to the USB host so that the USB host re-enumerates the USB device.

In an embodiment of the invention, an operation method of a USB integrated circuit includes: reporting a first adapter configuration to a USB host, so that the USB host enumerates a USB device; observing a behavior of the USB host to the USB device after the USB device is enumerated; determining whether the first adapter configuration is suitable for a connection manager of the USB host according to the behavior; and reporting a second adapter configuration to the USB host when the first adapter configuration is not suitable for the connection manager, so that the USB host re-enumerates the USB device. The USB integrated circuit is suitable for being disposed in the USB device.

In an embodiment of the invention, the USB device includes a USB connector and a USB integrated circuit. The USB connector includes at least one channel pin and at least one sideband use pin. The USB integrated circuit includes a sideband use interface circuit and a control circuit. The sideband use interface circuit is suitable to be coupled to a sideband use pin in the at least one sideband use pin. The control circuit is suitable to be coupled to the sideband use interface circuit and reports a first adapter configuration to a USB host via the sideband use interface circuit so that the USB host enumerates the USB device. The control circuit observes a behavior of the USB host to the USB device after the USB device is enumerated, and the control circuit determines whether the first adapter configuration is suitable for a connection manager of the USB host according to the behavior. When the first adapter configuration is not suitable for the connection manager, the control circuit reports a second adapter configuration to the USB host so that the USB host re-enumerates the USB device.

Based on the above, the USB integrated circuit, the operation method of the USB integrated circuit, and the USB device provided by the embodiments of the invention may report the default adapter configuration to the USB host, and then, after the USB host enumerates the USB device, observe the behavior of the USB host to the USB device to determine the version of the connection manager and whether the default adapter configuration is suitable for the connection manager of the USB host. When the default adapter configuration is not suitable for the connection manager, the USB integrated circuit may instead report another adapter configuration to the USB host so that the USB host re-enumerates the USB device. In this way, the USB device may report the corresponding adapter configuration to the USB host according to the version of the connection manager, and thus may be compatible with any version of the connection manager.

In order to make the aforementioned features and advantages of the disclosure more comprehensible, embodiments accompanied with figures are described in detail below.

DESCRIPTION OF THE EMBODIMENTS

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/components/steps having the same reference numerals in figures and embodiments represent the same or similar parts. Elements/components/steps having the same reference numerals or having the same terminology in different embodiments may be cross-referenced.

An advantage of the invention is interoperability. Specifically, Intel's earlier firmware-based connection manager (NVM FW version V34) is not USB4 compliant and therefore may not be used with USB4 devices (USB4 ICs). The reason is that these non-USB4 compliant connection managers (NVM FW version V34) require a Peripheral Component Interconnect Express (PCIe) adapter. Therefore, these non-USB4-compliant connection managers (NVM FW version V34) work properly if the USB4 IC reports the adapter configuration having a dummy PCIe adapter to the USB4 host. However, if the USB4 IC reports that an adapter having a dummy PCIe adapter is configured to a USB4 host having a connection manager conforming to the USB4 specification, there may be interoperability issues during wake-up from "automatic suspend". The USB integrated circuit, the operation method of the USB integrated circuit, and the USB device disclosed in the following embodiments may determine the version of the connection manager (whether it complies with the USB4 specification) by observing the behavior of the USB host to the USB device so as to report the corresponding adapter configuration to the USB host. Therefore, the USB device may be compatible with any version of the connection manager without causing interoperability issues.

Figure 1:
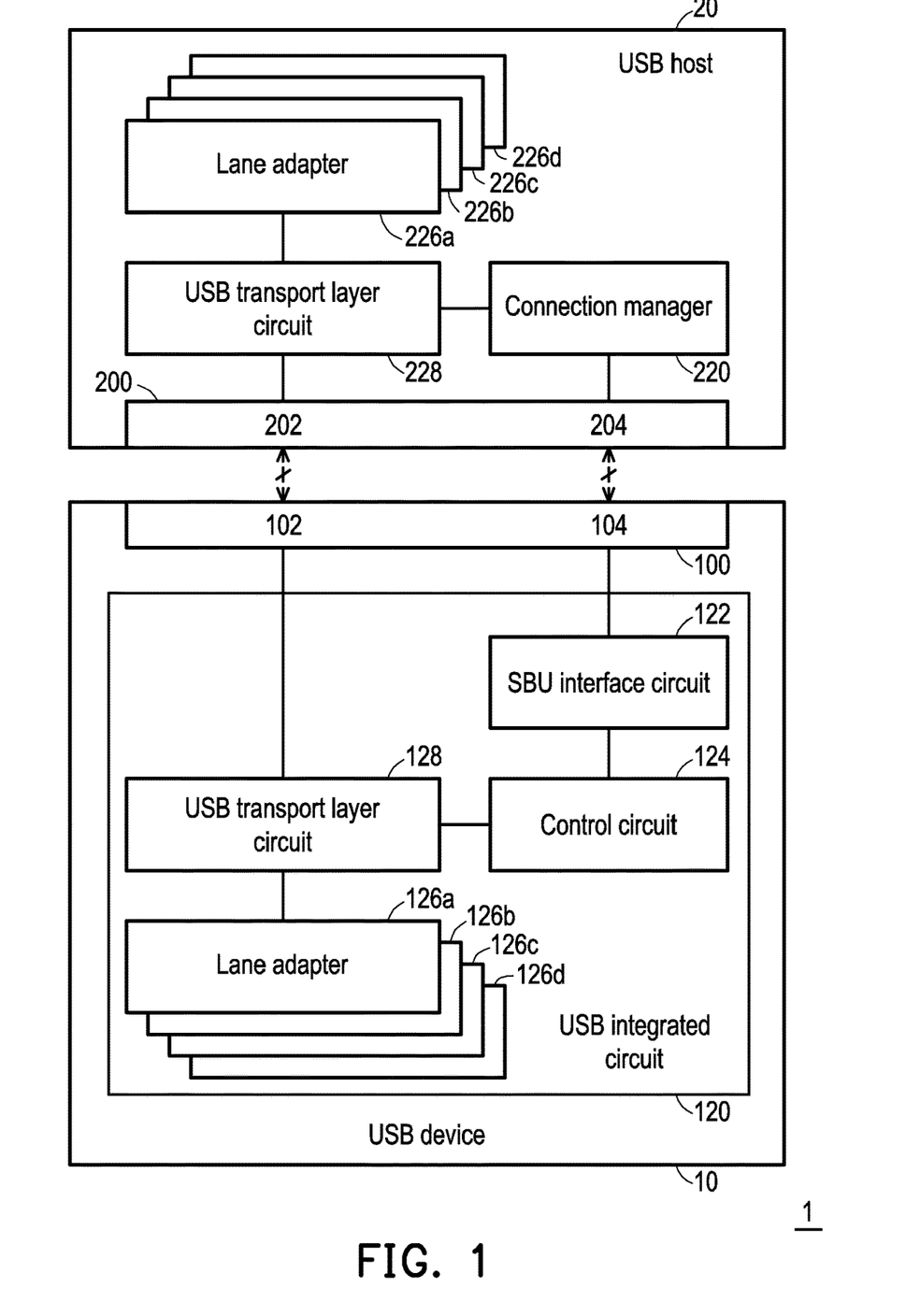
FIG. 1 is a schematic diagram of a circuit block of a USB transmission system shown according to an embodiment of the invention.

FIG. 1 is a schematic diagram of a circuit block of a USB transmission system shown according to an embodiment of the invention. Please refer to FIG. 1, a USB transmission system 1 includes a USB device 10 and a USB host 20. The USB device 10 has a USB connector 100 and includes a USB integrated circuit 120. The USB host 20 has a USB connector 200 and includes a connection manager 220. According to application requirements, the USB host 20 may be a personal computer, a notebook computer, or other electronic devices having a USB Type-C connector (also referred to as a USB-C connector).

In the present embodiment, the USB connector 100 may be connected (or directly connected) to the USB connector 200 of the USB host 20 via a cable. The USB connector 100 (or the USB connector 200) may be a USB-C connector. A channel pin 102 of the USB connector 100 (or a channel pin 202 of the USB connector 200) may include TX1+pin, TX1−pin, RX1+pin, RX1−pin, TX2+pin, TX2−pin, RX2+pin, and/or RX2−pin as specified by the USB specification. A sideband use (SBU) pin 104 of the USB connector 100 (or an SBU pin 204 of the USB connector 200) may include an SBU1 pin and/or an SBU2 pin specified by the USB specification.

In an embodiment, a configuration channel (CC) pin of the USB connector 100 (or a CC pin of the USB connector 200) (not shown in FIG. 1) may include a CC1 pin and/or a CC2 pin. The USB device 10 further includes a power delivery (PD) controller (not shown in FIG. 1), and the CC pin of the USB connector 100 is coupled to the PD controller. When the USB host 20 is connected to the USB connector 100, the PD controller may exchange configuration information with the USB host 20 via the CC pin. Therefore, according to the configuration information of the CC pin, the PD controller may know whether the USB host 20 connected to the USB connector 100 is an electronic device supporting the USB4 specification or an electronic device supporting the display port alternative mode (ALT mode) of the USB specification (e.g., USB 3.2 specification). The related operations of the PD controller and the CC pin are regulated in the USB specification, and are therefore not repeated herein.

In the USB4 specification, the double line data channel established by the channel pin 102 of the USB connector 100 and the channel pin 202 of the USB connector 200 transmits USB4 data packets between the USB device 10 and the USB host 20. The channel pin 102, the channel pin 202, and the USB4 data packet are regulated in the USB4 specification, and are therefore not repeated herein.

Moreover, in the USB4 specification, the double line sideband (SB) channel established by the SBU pin 104 of the USB connector 100 and the SBU pin 204 of the USB connector 200 transmits a SB signal conforming to the USB4 specification between the USB device 10 and the USB host 20. The SBU pin 204 of the USB connector 200 is coupled to the connection manager 220. Via the SB signal transmitted between the USB device 10 and the USB host 20, the USB integrated circuit 120 may determine: whether the USB device 10 establishes a connection with the USB host 20, the start and close of the channel, the initialization of the channel, and entering or leaving sleep mode. Moreover, the USB integrated circuit 120 may also obtain basic information (e.g., vendor ID (VID) or product ID (PID)) about the USB host 20 via the SBU pin 104. The SBU pin 104, the SBU pin 204, and the SB signal are regulated in the USB4 specification, and are therefore not repeated herein.

In the present embodiment, the USB integrated circuit 120 includes an SBU interface circuit 122 and a control circuit 124. The SBU interface circuit 122 is coupled to the SBU pin 104 of the USB connector 100. The SBU interface circuit 122 may transmit the SB signal conforming to the USB4 specification via the SBU pin 104 of the USB connector 100.

The control circuit 124 is coupled to the SBU interface circuit 122. The control circuit 124 is, for example, a central processing unit (CPU) or a programmable general-use or special-use microprocessor, digital signal processor (DSP), programmable controller, application-specific integrated circuit (ASIC), or other similar devices or a combination of these devices. In the present embodiment, the control circuit 124 may load the firmware code from the storage device (not shown in FIG. 1) to execute the operation method of the USB integrated circuit of an embodiment of the invention, and the operation method is further described in detail in FIG. 2.

In an embodiment, the USB integrated circuit 120 includes lane adapters (for example, 126a, 126 b, 126c, and 126d shown in FIG. 1) and a USB transport layer circuit 128. The USB transport layer circuit 128 is coupled between the channel pin 102 of the USB connector 100 and the lane adapters 126a, 126b, 126c, and 126d, and is coupled to the control circuit 124. The USB transport layer circuit 128 may be a transport layer circuit conforming to the USB4 specification, and the lane adapters 126a, 126b, 126c, and 126d may be lane adapters conforming to the USB4 specification.

It is worth noting that the adapter configuration of these lane adapters (e.g., 126a, 126b, 126c, and 126d shown in FIG. 1) may be set according to the actual design. For example (not limited thereto), one of the lane adapters 126a, 126b, 126c, and 126d may be a USB4 lane adapter, a USB3 adapter, a display port output (DP OUT) adapter, or other adapters. It should be mentioned that, for simplicity, the lane adapters in the USB integrated circuit 120 shown in FIG. 1 only show the four lane adapters 126a, 126b, 126c, and 126d as an example. However, those skilled in the art may suitably adjust the number of lane adapters according to the actual application situation, and the present embodiment is not limited thereto. In some embodiments, the USB integrated circuit 120 also includes other adapters and related circuits that conform to the USB4 specification, which are not discussed herein.

Based on the enumeration and lane bonding of the connection manager 220, the USB transport layer circuit 128 may selectively distribute data packets from the logic layer circuit (not shown in FIG. 1) to corresponding adapters in the lane adapters 126a, 126b, 126c, and 126d. For example, when the current USB4 data packet contains USB3 data, the USB transport layer circuit 128 may transmit the current USB4 data packet to the USB3 adapter. The USB3 adapter may restore the current USB4 data packet to a USB3 data packet, and transmit the USB3 data packet to the USB3 interface circuit (not shown in FIG. 1). When the current USB4 data packet contains the DP data packet, the USB transport layer circuit 128 may transmit the current USB4 data packet to the DP OUT adapter. The DP OUT adapter may restore the current USB4 data packet to the DP data packet, and transmit the DP data packet to the DP interface circuit (not shown in FIG. 1).

In an embodiment, the USB host 20 includes lane adapters 226a, 226b, 226c, and 226d and a USB transport layer circuit 228. The USB transport layer circuit 228 is coupled between the channel pin 202 of the USB connector 200 and the lane adapters 226a, 226b, 226c, and 226d, and is coupled to the connection manager 220. The USB transport layer circuit 228 in the USB host 20 may be a transport layer circuit conforming to the USB4 specification, and is therefore not repeated herein. For the operations between the lane adapters 226a, 226b, 226c, and 226d and the USB transport layer circuit 228, reference may be made to the above related descriptions about the lane adapters 126a, 126b, 126c, 126d and the USB transport layer circuit 128, and inference may be made by analogy, and are therefore not repeated herein. It should be mentioned that, for simplicity, only the four lane adapters 226a, 226b, 226c, and 226d are shown in the lane adapters in the USB host 20 in FIG. 1 of the present embodiment as an example. However, those having ordinary skill in the art may suitably adjust the number of lane adapters according to the actual application situation, which is not limited in the present embodiment. In some embodiments, the USB host 20 includes a USB4 lane adapter, a USB3 adapter, a DP OUT adapter, or other adapters and related circuits that conform to the USB4 specification.

In an embodiment, the USB transmission system 1 further includes a memory (not shown in FIG. 1), and the memory is, for example, random-access memory (RAM), flash memory, programmable read-only memory (PROM), electrically alterable read-only memory (EAROM), erasable programmable read-only memory (EPROM), and/or electrically erasable programmable read-only memory (EEPROM), etc. In the present embodiment, the memory is coupled to the control circuit 124 and used to store the valid information of the connection manager 220. In an embodiment, the valid information of the connection manager 220 includes the version of the connection manager 220 or the adapter configuration suitable for the connection manager 220.

Figure 2:
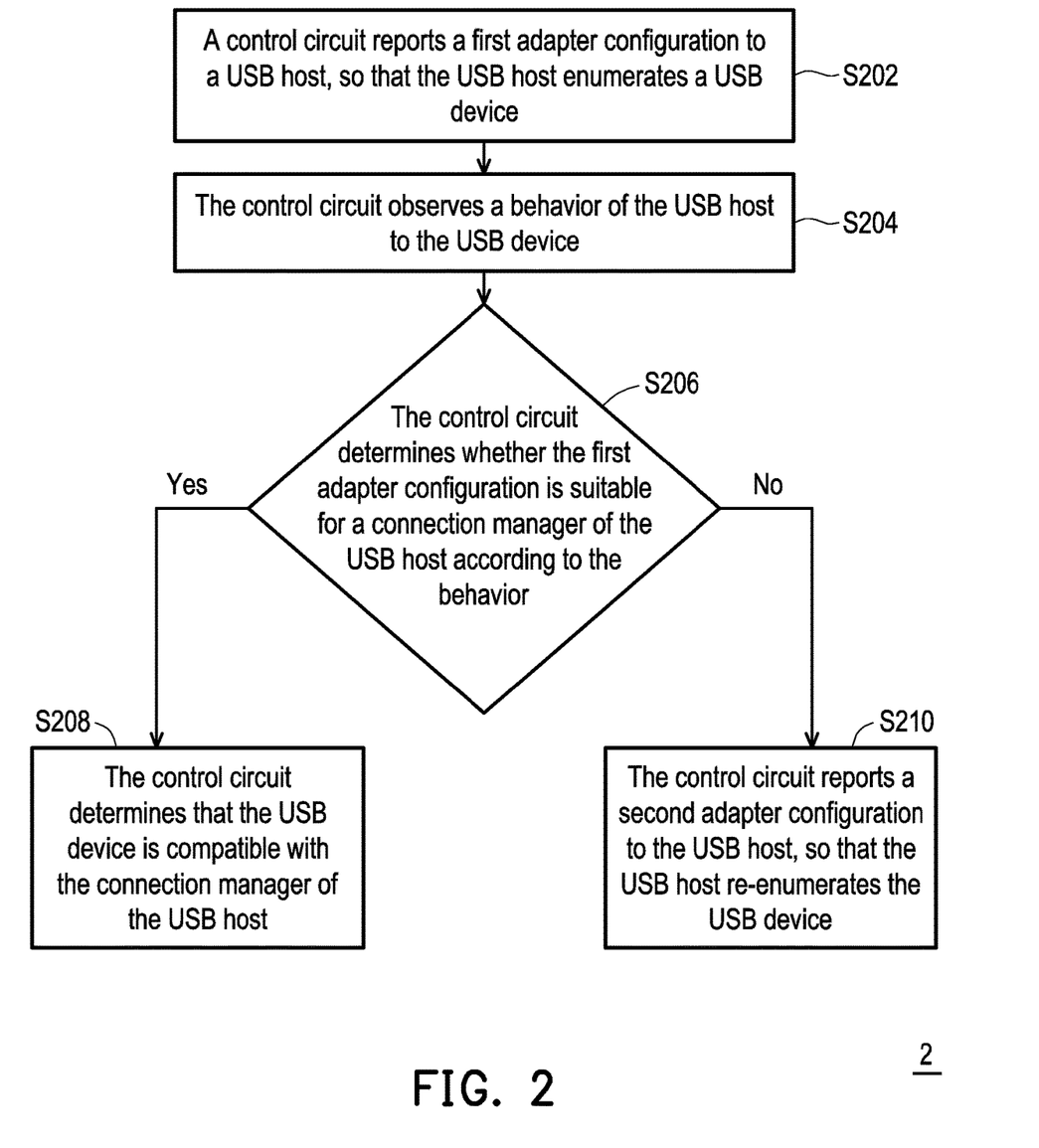
FIG. 2 is a schematic flowchart of an operation method of a USB integrated circuit shown according to an embodiment of the invention.

FIG. 2 is a schematic flowchart of an operation method of a USB integrated circuit shown according to an embodiment of the invention. An operation method 2 shown in FIG. 2 is suitable for the USB integrated circuit 120 in the USB device 10 shown in FIG. 1. The operation method 2 shown in FIG. 2 is described in detail below with reference to various elements of the embodiment of FIG. 1.

Please refer to FIG. 1 and FIG. 2. First, in step S202, the control circuit 124 reports the first adapter configuration to the USB host 20 via the SBU interface circuit 122, so that the USB host 20 enumerates the USB device 10 according to the first adapter configuration. In step S204, after the USB device 10 is enumerated, the control circuit 124 observes the behavior of the USB host 20 to the USB device 10. Next, in step S206, the control circuit 124 determines whether the first adapter configuration reported to the USB host 20 is suitable for the connection manager 220 of the USB host 20 according to the behavior of the USB host 20.

When the first adapter configuration is suitable for the connection manager 220 (the determination result of step S206 is "Yes"), the control circuit 124 may proceed to step S208. In step S208, the control circuit 124 determines that the USB device 10 is compatible with the connection manager 220 of the USB host 20 without further operation. When the first adapter configuration is not suitable for the connection manager 220 (the determination result of step S206 is "No"), the control circuit 124 may proceed to step S210. In step S210, the control circuit 124 reports the second adapter configuration to the USB host 20, so that the USB host 20 re-enumerates the USB device 10 according to the second adapter configuration.

In an embodiment, the first adapter configuration is the adapter configuration AC1, and the second adapter configuration is the adapter configuration AC2. In another embodiment, the first adapter configuration is the adapter configuration AC2, and the second adapter configuration is the adapter configuration AC1. In particular, the adapter configuration AC1 faithfully represents a plurality of adapters of the USB IC 120 (e.g., 126a, 126b, 126c, and 126d shown in FIG. 1), and the adapter configuration AC2 includes one (or a plurality of) dummy lane adapters. Dummy lane adapters (e.g., dummy PCIe adapters, etc.) are lane adapters that are not actually present in the USB integrated circuit 120. The adapter configuration AC2 may determine the content thereof according to the actual application. For example, the adapter configuration AC1 includes, for example, two USB4 lane adapters, one USB3 upstream adapter, and one DP OUT adapter, and the adapter configuration AC2 includes, for example, eight USB4 lane adapters, one un-supported adapter, one PCIe upstream adapter, three PCIe downstream adapters, one USB3 upstream adapter, three USB3 downstream adapters, and two DP OUT adapters.

Figure 3A:
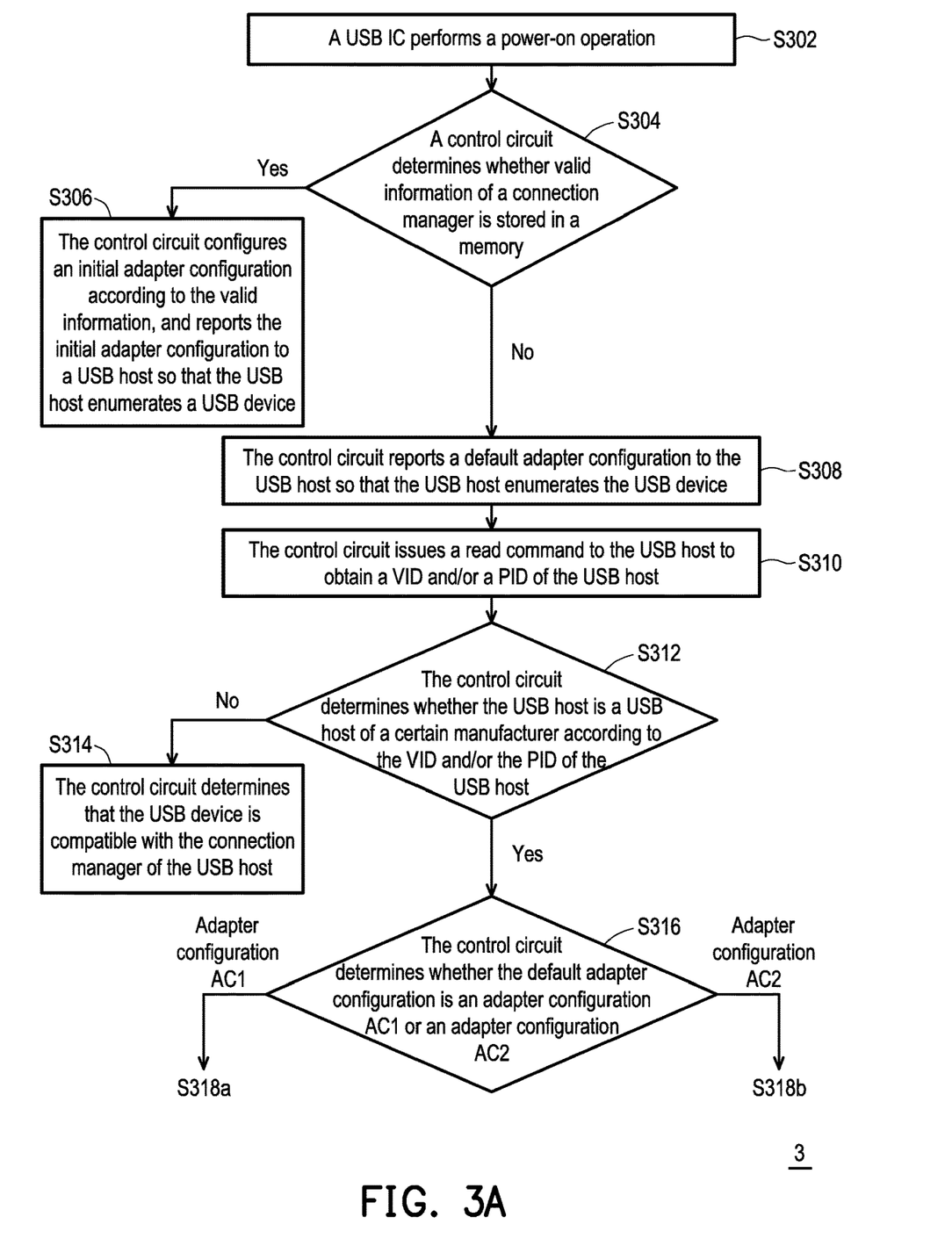
FIG. 3A to FIG. 3C are schematic flowcharts of an operation method of a USB integrated circuit shown according to another embodiment of the invention.
Figure 3B:
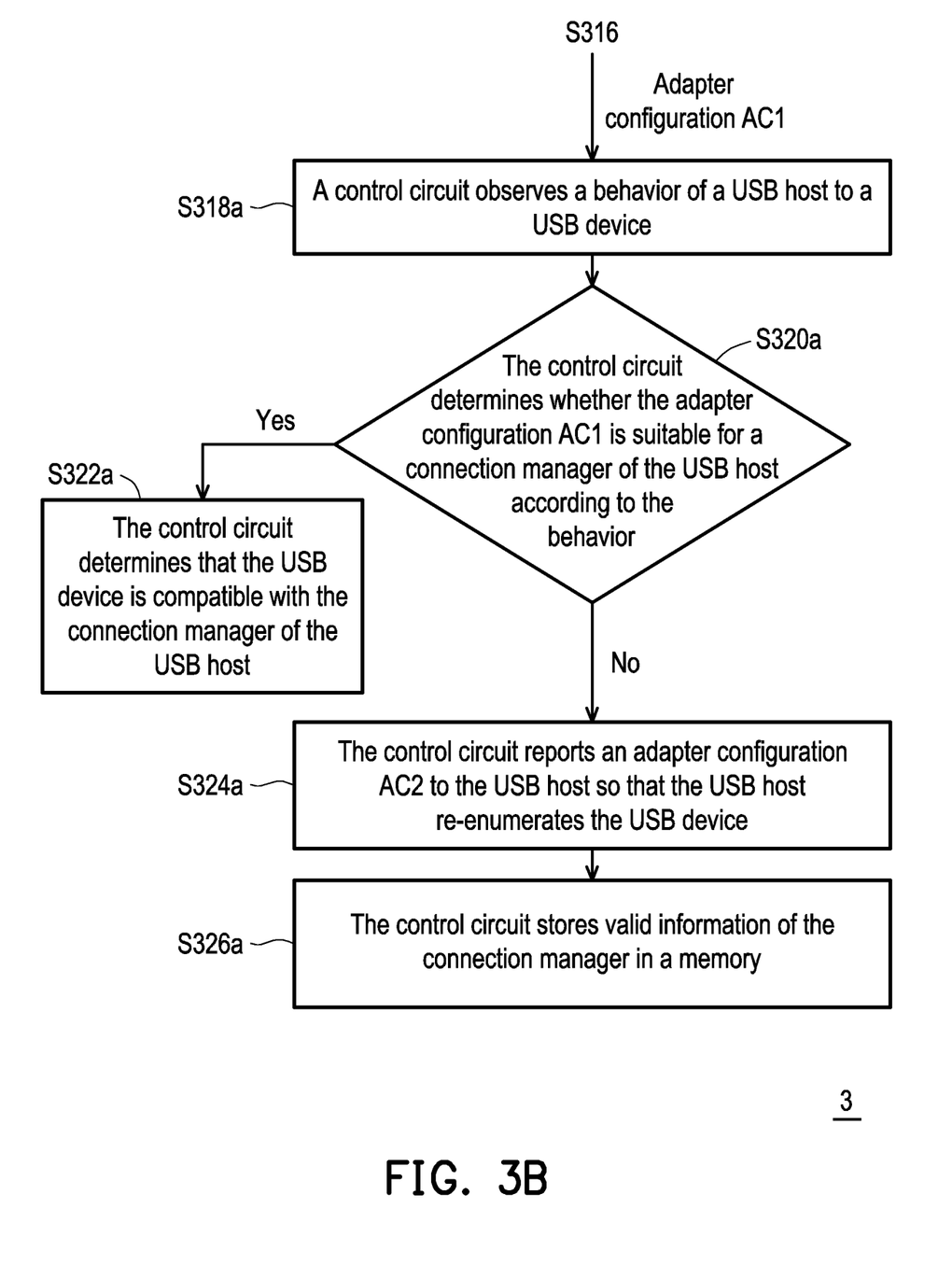
Figure 3C:
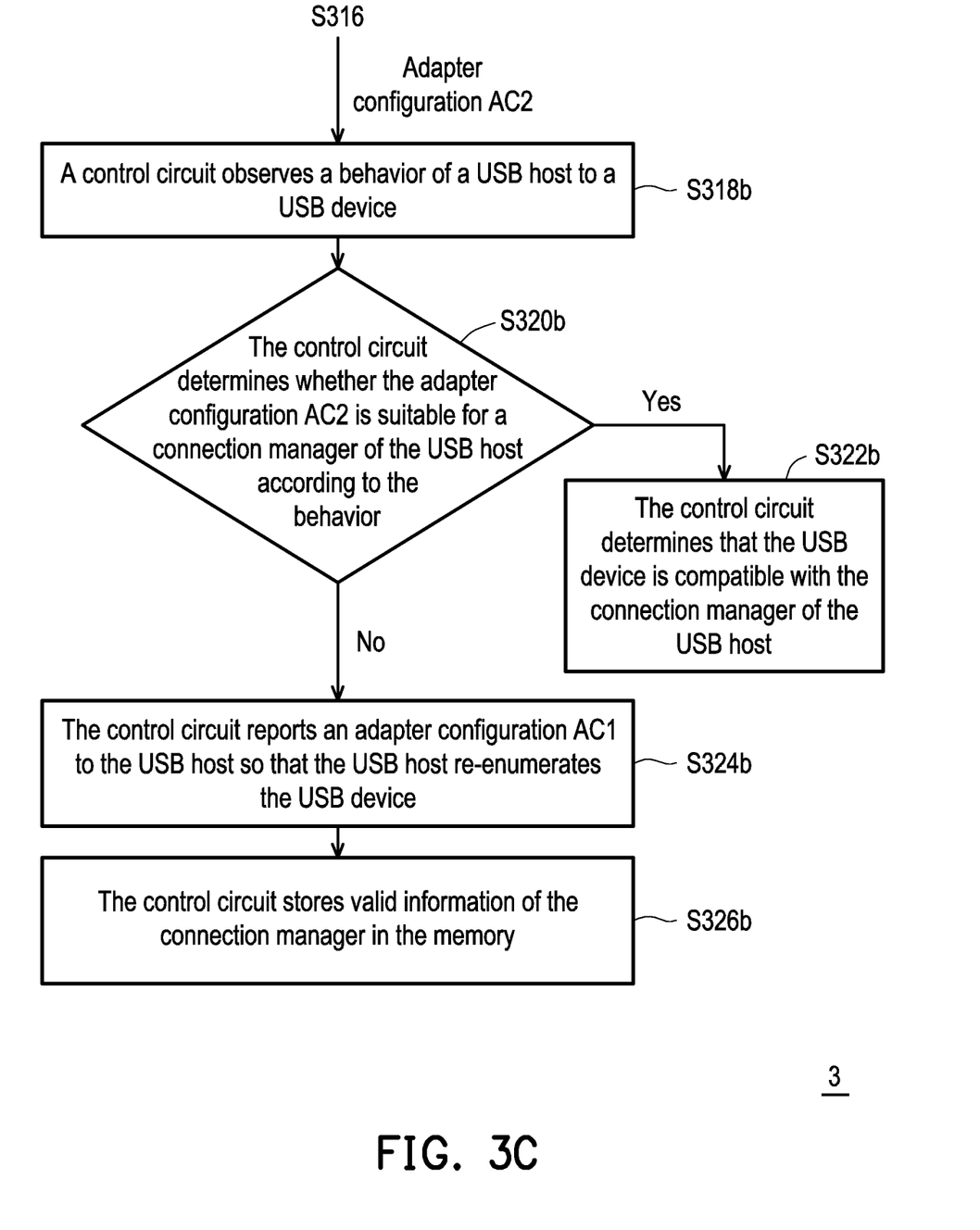

FIG. 3A to FIG. 3C are schematic flowcharts of an operation method of a USB integrated circuit shown according to another embodiment of the invention. An operation method 3 shown in FIG. 3A to FIG. 3C is suitable for the USB integrated circuit 120 in the USB device 10 shown in FIG. 1. The operation method 3 shown in FIG. 3A to FIG. 3C is described in detail below with reference to various elements of the embodiment of FIG. 1.

Please refer to FIG. 1 and FIG. 3A to FIG. 3C. First, in step S302, the USB integrated circuit 120 performs a power-on operation. In step S304, after the USB integrated circuit 120 is powered on, the control circuit 124 determines whether the valid information of the connection manager 220 is stored in the memory (not shown in FIG. 1). In an embodiment, the valid information of the connection manager 220 includes the version of the connection manager 220 or the adapter configuration suitable for the connection manager 220, but the invention is not limited thereto.

If the control circuit 124 determines that the valid information of the connection manager 220 is stored in the memory (the determination result of step S304 is "Yes"), the control circuit 124 may proceed to step S306. In step S306, the control circuit 124 configures the initial adapter configuration according to the valid information, and reports the initial adapter configuration to the USB host 20 so that the USB host 20 enumerates the USB device 10. Specifically, the initial adapter configuration may be an adapter configuration AC1 (an adapter configuration faithfully representing a plurality of adapters of the USB IC 120), and may also be an adapter configuration AC2 (an adapter configuration including one or a plurality of dummy lane adapters). The control circuit 124 reports the corresponding initial adapter configuration to the USB host 20 via the SBU interface circuit 122 according to the version of the connection manager 220 or the adapter configuration suitable for the connection manager 220 so that the USB host 20 enumerates the USB device 10.

If the control circuit 124 determines that the valid information of the connection manager 220 is not stored in the memory (the determination result of step S304 is "No"), the control circuit 124 may proceed to step S308. In step S308, the control circuit 124 uses the default adapter configuration as the currently used adapter configuration (the first adapter configuration), and reports the default adapter configuration to the USB host 20 so that the USB host 20 enumerates the USB device 10. In an embodiment, the default adapter configuration may be the adapter configuration AC1 (an adapter configuration faithfully representing a plurality of adapters of the USB integrated circuit 120). In another embodiment, the preset adapter configuration may be the adapter configuration AC2 (an adapter configuration including one or a plurality of dummy lane adapters). Specifically, the control circuit 124 reports the default adapter configuration (the adapter configuration AC1 or the adapter configuration AC2) to the USB host 20 via the SBU interface circuit 122, so that the USB host 20 enumerates the USB device 10.

In step S310, the control circuit 124 issues a read command to the USB host 20 via the SBU interface circuit 122 to obtain the VID and/or the PID of the USB host 20. Next, the control circuit 124 determines whether to continue to use the default adapter configuration as the currently used adapter configuration according to the VID and/or the PID of the USB host 20. Specifically, in step S312, the control circuit 124 determines whether the USB host 20 is a USB connection manager of a certain manufacturer according to the VID and/or the PID of the USB host 20. In the application scenario example shown in FIG. 3A, the connection manager of a certain manufacturer has a version compatibility issue.

If the control circuit 124 determines that the connection manager 220 of the USB host 20 is not the USB connection manager of a certain manufacturer (the determination result of step S312 is "No"), the control circuit 124 may proceed to step S314. In step S314, the control circuit 124 determines that the USB device 10 is compatible with the connection manager 220 of the USB host 20 (the default adapter configuration reported in step S308 is suitable for the connection manager 220) without further operation.

If the control circuit 124 determines that the connection manager 220 of the USB host 20 is the USB connection manager of a certain manufacturer (the determination result of step S312 is "Yes"), the control circuit 124 may proceed to step S316. In step S316, the control circuit 124 determines whether the default adapter configuration reported in step S308 is the adapter configuration AC1 (an adapter configuration faithfully representing a plurality of adapters of the USB integrated circuit 120) or the adapter configuration AC2 (an adapter configuration including one or a plurality of dummy lane adapters).

If the control circuit 124 determines that the default adapter configuration reported in step S308 is the adapter configuration AC1 (the determination result of step S316 is "adapter configuration AC1"), the control circuit 124 may perform step S318a shown in FIG. 3B. In step S318a, the control circuit 124 observes the behavior of the USB host 20 to the USB device 10 after the USB device 10 is enumerated. Next, in step S320a, the control circuit 124 determines whether the adapter configuration AC1 is suitable for the connection manager 220 of the USB host 20 according to the behavior of the USB host 20. Specifically, in an embodiment, when the control circuit 124 uses the adapter configuration AC1 as the currently used adapter configuration, when the behavior of the USB host 20 observed by the control circuit 124 indicates that "the USB3 tunneling path is not established between the USB host 20 and the USB device 10", the control circuit 124 determines that the adapter configuration AC1 is not suitable for the connection manager 220 (the determination result of step S320a is "No"). Conversely, the control circuit 124 determines that the adapter configuration AC1 is suitable for the connection manager 220.

When the adapter configuration AC1 is suitable for the connection manager 220 (the determination result of step S320a is "Yes"), the control circuit 124 may proceed to step S322a. In step S322a, the control circuit 124 determines that the USB device 10 is compatible with the connection manager 220 of the USB host 20 without further operation.

When the adapter configuration AC1 is not suitable for the connection manager 220 (the determination result of step S320a is "No"), the control circuit 124 may proceed to step S324a. In step S324a, the control circuit 124 uses the adapter configuration AC2 (second adapter configuration) as the currently used adapter configuration. That is, the control circuit 124 reports the adapter configuration AC2 to the USB host 20, so that the USB host 20 re-enumerates the USB device 10. In an embodiment, by re-establishing the SB channel between the SBU pin 104 of the USB connector 100 and the SBU pin 204 of the USB connector 200, the control circuit 124 may make the USB host 20 to re-enumerate the USB device 10, thus enabling the connection manager 220 to successfully establish a USB3 tunneling path between the USB host 20 and the USB device 10.

In step S326a, after the USB host 20 re-enumerates the USB device 10, the connection manager 220 establishes a USB3 tunneling path having the first identification code between the USB host 20 and the USB device 10, and the control circuit 124 stores the valid information corresponding to the connection manager 220 in a memory (not shown). Particularly, the first identification code is the HopID value recorded in the packet transmitted on the USB3 tunneling path, and in the present embodiment, the HopID value is 0X10. In an embodiment, the valid information includes the version of the connection manager 220 (e.g., NVM FW version V34) or the adapter configuration AC2 suitable for the connection manager 220. In another embodiment, the valid information further includes the first identification code, and the present embodiment is not limited thereto.

Referring back to S316 shown in FIG. 3A, if the control circuit 124 determines that the default adapter configuration reported in step S308 is the adapter configuration AC2 (the determination result of step S316 is "adapter configuration AC2"), the control circuit 124 may perform step S318b shown in FIG. 3C. In step S318b, the control circuit 124 observes the behavior of the USB host 20 to the USB device 10 after the USB device 10 is enumerated. Next, in step S320b, the control circuit 124 determines whether the adapter configuration AC2 is suitable for the connection manager 220 of the USB host 20 according to the behavior of the USB host 20. Specifically, if the control circuit 124 is using the adapter configuration AC2 as the currently used adapter configuration, when the control circuit 124 observes that the behavior of the USB host 20 indicates "a USB3 tunneling path having the second identification code is established between the USB host 20 and the USB device 10", the control circuit 124 determines that the adapter configuration AC2 is not suitable for the connection manager 220 (the determination result of step S320b is "No"). Conversely, the control circuit 124 determines that the adapter configuration AC2 is suitable for the connection manager 220. In an embodiment, the second identification code is the HopID value recorded in the packet transmitted on the USB3 tunneling path (in the present embodiment, the HopID value is 0X08).

When the adapter configuration AC2 is suitable for the connection manager 220 (the determination result of step S320b is "Yes"), the control circuit 124 may proceed to step S322b. In step S322b, the control circuit 124 determines that the USB device 10 is compatible with the connection manager 220 of the USB host 20 without further operation.

When the adapter configuration AC2 is not suitable for the connection manager 220 (the determination result of step S320b is "No"), the control circuit 124 may proceed to step S324b. In step S324b, the control circuit 124 uses the adapter configuration AC1 (second adapter configuration) as the currently used adapter configuration. That is, the control circuit 124 reports the adapter configuration AC1 to the USB host 20, so that the USB host 20 re-enumerates the USB device 10. In an embodiment, by re-establishing the SB channel between the SBU pin 104 of the USB connector 100 and the SBU pin 204 of the USB connector 200, the control circuit 124 may make the USB host 20 to re-enumerate the USB device 10, thus allowing the connection manager 220 to not issue an abnormal reset in the USB3 tunneling path after the USB4 device resumes from sleep mode.

In step S326b, after the USB host 20 re-enumerates the USB device 10, the control circuit 124 stores the valid information corresponding to the connection manager 220 in a memory (not shown). In an embodiment, the valid information includes the version of the connection manager 220 (e.g., NVM FW version V41) or the adapter configuration AC1 suitable for the connection manager 220. In another embodiment, the valid information further includes the second identification code, and the present embodiment is not limited thereto.

It should be mentioned that, the specific order and/or hierarchy of the steps in the method of an embodiment of the disclosure is only an exemplary approach. Based on design preferences, the specific order or hierarchy of the steps of the disclosed method or process may be rearranged while remaining within the scope of the embodiments of the disclosure. Therefore, those of ordinary skill in the art will understand that the methods and techniques of the embodiments of the disclosure present various steps or actions in a sample order, and the embodiments of the disclosure are not limited to the specific order or hierarchy presented, unless explicitly stated otherwise.

According to different design requirements, the implementation of the blocks of the SBU interface circuit 122 and/or the control circuit 124 may be in the form of hardware, firmware, software (i.e., program), or a combination of a plurality of the three.

In terms of hardware, the blocks of the SBU interface circuit 122 and/or the control circuit 124 may be implemented in a logic circuit on an integrated circuit. The related functions of the SBU interface circuit 122 and/or the control circuit 124 may be implemented as hardware using a hardware description language such as Verilog HDL or VHDL or other suitable programming languages. For example, the related functions of the SBU interface circuit 122 and/or the control circuit 124 may be implemented in one or more controllers, microcontrollers, microprocessors, application-specific integrated circuits (ASICs), digital signal processors (DSPs), field-programmable gate arrays (FPGAs), and/or various logic blocks, modules, and circuits in other processing units.

In software form and/or firmware form, the related functions of the SBU interface circuit 122 and/or the control circuit 124 may be implemented as programming codes. For example, the SBU interface circuit 122 and/or the control circuit 124 may be implemented using a general programming language (such as C, C++, or a combination language) or other suitable programming languages. The programming codes may be recorded/stored in a recording medium, and the recording medium includes, for example, a read-only memory (ROM), a storage device, and/or a random-access memory (RAM). A computer, a central processing unit (CPU), a controller, a microcontroller, or a microprocessor may read and execute the programming codes from the recording medium to achieve a related function. As the recording medium, a "non-transitory computer-readable medium" may be used. For example, a tape, a disk, a card, a semiconductor memory, a programmable logic circuit, etc. may be used. Moreover, the program may also be provided to the computer (or CPU) via any transmission medium (communication network or broadcast wave, etc.) The communication network is, for example, the Internet, wired communication, wireless communication, or other communication media.

Based on the above, the USB integrated circuit, the operation method of the USB integrated circuit, and the USB device provided by the embodiments may report the default adapter configuration to the USB host, and then, after the USB host enumerates the USB device, observe the behavior of the USB host to the USB device to determine the version of the connection manager and whether the default adapter configuration is suitable for the connection manager of the USB host. When the default adapter configuration is not suitable for the connection manager, the USB integrated circuit may instead report another adapter configuration to the USB host so that the USB host re-enumerates the USB device. In this way, the USB device may report the corresponding adapter configuration to the USB host according to the version of the connection manager, and thus may be compatible with any version of the connection manager.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A USB integrated circuit, suitable for being disposed in a USB device, comprising:
    a sideband use interface circuit suitable to be coupled to a sideband use pin of a USB connector of the USB device; and
    a control circuit suitable to be coupled to the sideband use interface circuit and reporting a first adapter configuration to a USB host via the sideband use interface circuit so that the USB host enumerates the USB device, wherein the control circuit observes a behavior of the USB host to the USB device after the USB device is enumerated, the control circuit determines whether the first adapter configuration is suitable for a connection manager of the USB host according to the behavior, and when the first adapter configuration is not suitable for the connection manager, the control circuit reports a second adapter configuration to the USB host so that the USB host re-enumerates the USB device.

2. The USB integrated circuit of claim 1, wherein the control circuit determines that the first adapter configuration is not suitable for the connection manager when the behavior indicates that a USB3 tunneling path is not established between the USB host and the USB device, wherein the first adapter configuration faithfully represents a plurality of adapters of the USB integrated circuit and the second adapter configuration comprises a plurality of dummy lane adapters.

3. The USB integrated circuit of claim 2, wherein after the USB host re-enumerates the USB device, the connection manager establishes a USB3 tunneling path having a first identification code between the USB host and the USB device, and the control circuit stores valid information of the connection manager in a memory, wherein the valid information comprises a version of the connection manager or an adapter configuration suitable for the connection manager.

4. The USB integrated circuit of claim 1, wherein the control circuit determines that the first adapter configuration is not suitable for the connection manager when the behavior indicates a USB3 tunneling path having a second identification code is established between the USB host and the USB device, wherein the first adapter configuration comprises a plurality of dummy lane adapters and the second adapter configuration faithfully represents a plurality of adapters of the USB integrated circuit.

5. The USB integrated circuit of claim 4, wherein after the USB host re-enumerates the USB device, the control circuit stores valid information of the connection manager in a memory, wherein the valid information comprises a version of the connection manager or an adapter configuration suitable for the connection manager.

6. The USB integrated circuit of claim 1, wherein after the USB integrated circuit is powered on, the control circuit determines whether valid information of the connection manager is stored in a memory,
    when the control circuit determines that the valid information of the connection manager is stored in the memory, the control circuit configures an initial adapter configuration as the first adapter configuration according to the valid information so that the USB host enumerates the USB device.

7. The USB integrated circuit of claim 6, wherein the valid information comprises a version of the connection manager or an adapter configuration suitable for the connection manager.

8. The USB integrated circuit of claim 6, wherein when the control circuit determines that the valid information of the connection manager is not stored in the memory, the control circuit uses a default adapter configuration as the first adapter configuration so that the USB host enumerates the USB device.

9. The USB integrated circuit of claim 8, wherein the default adapter configuration faithfully represents a plurality of adapters of the USB integrated circuit.

10. The USB integrated circuit of claim 1, wherein the control circuit issues a read command to the USB host via the sideband use interface circuit to obtain a vendor ID code or a product ID code of the USB host,
    the control circuit determines whether to use a default adapter configuration as the first adapter configuration for the USB host to enumerate the USB device according to the vendor ID code or the product ID code.

11. An operation method of a USB integrated circuit, the USB integrated circuit is suitable for being disposed in a USB device, and the operation method comprises:
    reporting a first adapter configuration to a USB host, so that the USB host enumerates the USB device;
    observing a behavior of the USB host to the USB device after the USB device is enumerated;
    determining whether the first adapter configuration is suitable for a connection manager of the USB host according to the behavior; and
    reporting a second adapter configuration to the USB host when the first adapter configuration is not suitable for the connection manager, so that the USB host re-enumerates the USB device, and the USB device is compatible with a version of the connection manager.

12. The operation method of claim 11, further comprising:
    determining that the first adapter configuration is not suitable for the connection manager when the behavior indicates that a USB3 tunneling path is not established between the USB host and the USB device, wherein the first adapter configuration faithfully represents a plurality of adapters of the USB integrated circuit and the second adapter configuration comprises a plurality of dummy lane adapters.

13. The operation method of claim 12, wherein after the USB host re-enumerates the USB device, the connection manager establishes a USB3 tunneling path having a first identification code between the USB host and the USB device, and the operation method further comprises:
- storing valid information of the connection manager in a memory, wherein the valid information comprises a version of the connection manager or an adapter configuration suitable for the connection manager.

14. The operation method of claim 11, further comprising:
- determining that the first adapter configuration is not suitable for the connection manager of the USB host when the behavior indicates a USB3 tunneling path having a second identification code is established between the USB host and the USB device, wherein the first adapter configuration comprises a plurality of dummy lane adapters and the second adapter configuration faithfully represents a plurality of adapters of the USB integrated circuit.

15. The operation method of claim 14, further comprising:
- storing valid information of the connection manager in a memory, wherein the valid information comprises a version of the connection manager or an adapter configuration suitable for the connection manager.

16. The operation method of claim 11, further comprising:
- determining whether valid information of the connection manager is stored in a memory after the USB integrated circuit is powered on; and
- configuring an initial adapter configuration as the first adapter configuration according to the valid information, so that the USB host enumerates the USB device when it is determined that the valid information of the connection manager is stored in the memory.

17. The operation method of claim 16, the operation method further comprising:
- using a default adapter configuration as the first adapter configuration so that the USB host enumerates the USB device when it is determined that the valid information of the connection manager is not stored in the memory.

18. The operation method of claim 17, wherein the default adapter configuration faithfully represents a plurality of adapters of the USB integrated circuit.

19. The operation method of claim 11, the operation method further comprising:
- issuing a read command to the USB host to obtain a vendor ID code or a product ID code of the USB host; and
- determining whether to use a default adapter configuration as the first adapter configuration for the USB host to enumerate the USB device according to the vendor ID code or the product ID code.

20. A USB device, comprising:
- a USB connector comprising at least one channel pin and at least one sideband use pin; and
- a USB integrated circuit, comprising:
  - a sideband use interface circuit suitable to be coupled to a sideband use pin in the at least one sideband use pin; and
  - a control circuit suitable to be coupled to the sideband use interface circuit and reporting a first adapter configuration to a USB host via the sideband use interface circuit so that the USB host enumerates the USB device, wherein the control circuit observes a behavior of the USB host to the USB device after the USB device is enumerated, the control circuit determines whether the first adapter configuration is suitable for a connection manager of the USB host according to the behavior, and when the first adapter configuration is not suitable for the connection manager, the control circuit reports a second adapter configuration to the USB host so that the USB host re-enumerates the USB device.

\* \* \* \* \*